United States Patent
Strunk et al.

(10) Patent No.: US 11,591,264 B2
(45) Date of Patent: Feb. 28, 2023

(54) COMPOSITION CONTAINING FURFURYL SILICATES AND FURFURYL ALCOHOL

(71) Applicant: HÜTTENES-ALBERTUS CHEMISCHE WERKE GESELLSCHAFT MIT BESCHRÄNKTER HAFTUNG, Düsseldorf (DE)

(72) Inventors: David Strunk, Kaarst (DE); Christian Fourberg, Mönchengladbach (DE); Gérard Ladégourdie, Düsseldorf (DE); Norbert Benz, Mönchengladbach (DE)

(73) Assignee: HÜTTENES-ALBERTUS CHEMISCHE WERKE GESELLSCHAFT MIT BESCHARÄNKTER HAFTUNG, Düsseldorf (DE)

(*) Notice: Subject to any disclaimer, the term of this patent is extended or adjusted under 35 U.S.C. 154(b) by 380 days.

(21) Appl. No.: 16/635,647

(22) PCT Filed: Jul. 30, 2018

(86) PCT No.: PCT/EP2018/070573
§ 371 (c)(1),
(2) Date: Jan. 31, 2020

(87) PCT Pub. No.: WO2019/025356
PCT Pub. Date: Feb. 7, 2019

(65) Prior Publication Data
US 2021/0130235 A1 May 6, 2021

(30) Foreign Application Priority Data
Jul. 31, 2017 (DE) ............... 10 2017 117 310.2

(51) Int. Cl.
| | |
|---|---|
| C04B 26/32 | (2006.01) |
| C07F 7/07 | (2006.01) |
| C07F 7/04 | (2006.01) |
| B33Y 10/00 | (2015.01) |
| B33Y 70/10 | (2020.01) |
| C04B 26/10 | (2006.01) |
| C04B 28/24 | (2006.01) |
| C04B 111/00 | (2006.01) |
| C04B 111/23 | (2006.01) |
| C04B 111/28 | (2006.01) |

(52) U.S. Cl.
CPC .............. *C04B 26/32* (2013.01); *B33Y 10/00* (2014.12); *B33Y 70/10* (2020.01); *C04B 26/105* (2013.01); *C04B 28/24* (2013.01); *C07F 7/04* (2013.01); *C07F 7/07* (2013.01); *C04B 2111/00181* (2013.01); *C04B 2111/23* (2013.01); *C04B 2111/28* (2013.01)

(58) Field of Classification Search
CPC ... C07F 7/04; C04B 26/32; C04B 2111/00181
See application file for complete search history.

(56) References Cited

U.S. PATENT DOCUMENTS

| | | | |
|---|---|---|---|
| 2,276,094 | A | 3/1942 | Rothrock |
| 2,300,812 | A | 11/1942 | Rust |
| 2,569,455 | A | 10/1951 | Culbertson et al. |
| 4,172,806 | A | 10/1979 | Vincent |
| 2018/0237556 | A1 | 8/2018 | Ichino |

FOREIGN PATENT DOCUMENTS

| | | |
|---|---|---|
| JP | 3-180242 | 8/1991 |
| JP | 2013-180318 | 9/2013 |
| KR | 20110049527 | 5/2011 |
| SU | 627135 | 8/1978 |
| WO | 2008017476 | 2/2008 |
| WO | 2010112581 | 10/2010 |

OTHER PUBLICATIONS

Grund. Angewandte Chemie International Edition, 2007, 46, 628-632 (Year: 2007).*
Zhong, J., et al., "Synthesis of Mesoporous Carbon-Bonded TiC/SiC Composites by Direct Carbonthermal Reduction of Sol-Gel Derived Monolithic Precursor," J. Am. Ceram. Soc.; 2011; 94 [11] 4025-4031.
Peppard et al., "Transesterification Reactions of Alkyl Silicates", Journal of the American Chemical Society, American Chemical Society, US, Jan. 1, 1946, vol. 68, pp. 77-79.
"Building Fire Protection and Thermal Insulation Construction of Phenolic Foam," Compiled by Jinzhou Haoweier Thermal Insulation Material Co., Ltd., China Building Materials Industry Press, Jan. 31, 2015.

* cited by examiner

*Primary Examiner* — Noble E Jarrell
(74) *Attorney, Agent, or Firm* — Duane Morris LLP; Gregory M. Lefkowitz

(57) ABSTRACT

Described are a composition comprising furfuryl silicates and furfuryl alcohol, especially for use as acid-curable binder, and processes for producing such a composition.

18 Claims, 1 Drawing Sheet

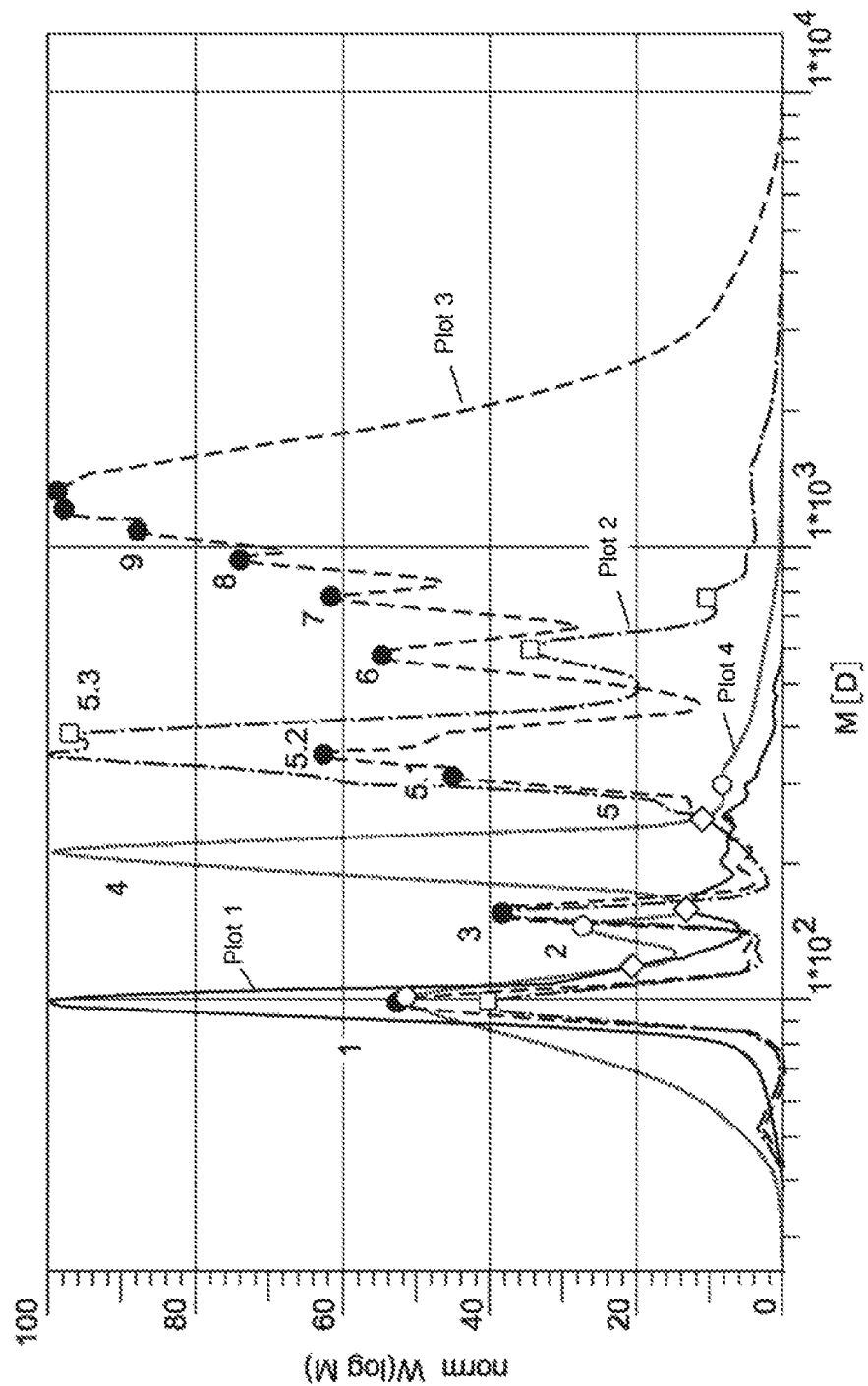

COMPOSITION CONTAINING FURFURYL SILICATES AND FURFURYL ALCOHOL

CROSS-REFERENCE TO RELATED APPLICATIONS

This application is a § 371 national stage entry of International Application No. PCT/EP2018/070573, filed on Jul. 30, 2018, which claims priority to German Patent Application No. 102017117310.2, filed on Jul. 31, 2017, the entire contents of which are incorporated herein by reference.

The present invention relates to a composition comprising furfuryl silicates, as defined in the claims, and furfuryl alcohol, especially for use as acid-curable binder, and to processes for producing such a composition. Further aspects of the present invention are apparent from the description, the working examples and the claims.

In the context of the present specification, the term "furfuryl silicates" denotes furfuryl esters of orthosilicic acid $Si(OH)_4$, where at least one of the four acid functions of the orthosilicic acid is esterified by furfuryl alcohol. Acid functions of the orthosilicic acid that are not esterified by furfuryl alcohol are esterified by alcohols from the group of linear and branched alkyl alcohols (i.e. a mixed ester is present), or (non-inventive) are substituted by substituents from the group of linear and branched alkyl radicals and of aryl radicals. "Furfuryl silicates" accordingly are furfuryl esters of orthosilicic acid where at least one, or two or more, or all the acid functions of the orthosilicic acid are esterified by furfuryl alcohol.

Acid-curable binders are binders whose curing is catalysed by acids. One technically and economically important group of acid-curable binders are the furan resins. Furan resins are polymers containing furan rings in the main chain. Furan resins are formed by acid-catalysed polycondensation of furfuryl alcohol with itself or with one or more comonomers, e.g. furfural, formaldehyde, urea, ketones or phenols. The applications of furan resins include binders for the production of foundry moulds and foundry cores (particularly in the no-bake process and in the warm-box process), for producing glass fibre-reinforced construction materials with high corrosion resistance, heat stability and flame retardancy for containers, pipelines and reactors, as chemically resistant putties, as low-temperature-curing adhesives, and as binders in the rapid prototyping process.

Binder compositions for forming furan resins customarily comprise furfuryl alcohol, optionally one or more of the aforesaid comonomers, and also low molecular mass condensation products (precondensates) of the homocondensation of furfuryl alcohol or of the condensation of the furfuryl alcohol with one or more comonomers. It is desirable in this context to minimize the fraction of toxic and environmentally harmful constituents such as furfuryl alcohol and formaldehyde. On the other hand, reducing the fraction of monomeric furfuryl alcohol relative to the fraction of the precondensations leads to an increase in the viscosity, so making it more difficult to work with the binder. There is therefore a strong demand for binder compositions for forming furan resins that retain good workability at a relatively low fraction of monomeric furfuryl alcohol and that are largely free from toxic and environmentally damaging comonomers such as formaldehyde.

Binder compositions described have included compositions which comprise furfuryl silicates (as defined above). Nevertheless, the known processes for preparing the required furfuryl silicates have significant disadvantages.

U.S. Pat. No. 2,569,455 discloses the obtainability of tetrafurfuryl silicate (silicic acid tetrafurfuryl ester) through reaction of furfuryl alcohol with silicon disulfide. Disadvantages of this process are the formation of hydrogen sulfide as a reaction product and the possible contamination of the reaction product by sulfur compounds (unconverted fractions of the starting product, and products of secondary reactions).

U.S. Pat. No. 2,300,812 describes the production of cement compositions, particularly for acid-resistant cements. The cement compositions comprise furfuryl orthosilicate as acid-curable binder. According to U.S. Pat. No. 2,300,812, furfuryl orthosilicate is prepared by reaction of furfuryl alcohol with an alkyl silicate whose alkyl radicals are selected such that the corresponding alkyl alcohol is more volatile than furfuryl alcohol. An example of an alkyl silicate used is tetraethyl orthosilicate, especially in the form of crude products or tailings of the reaction of ethyl alcohol with tetrachlorosilane. The reaction of furfuryl alcohol with an alkyl silicate according to U.S. Pat. No. 2,300,812 is executed at a temperature which is below the boiling points of furfuryl alcohol and of the alkyl silicate in question, yet is high enough to bring about distillative removal of the alkyl alcohol formed. The product obtained is described as a dark-brown, slightly viscous liquid (when using tetraethyl silicate as reactant) or as a very dark-coloured liquid of high viscosity (when using the crude product of the reaction of ethyl alcohol with tetrachlorosilane as reactant). No particular purity of the product is necessary according to US 2,300,812.

US 2,300,812 contains no information as to whether the reaction of furfuryl alcohol with an alkyl silicate took place in the presence of a catalyst. In our own investigations, however, it was determined that in the absence of catalysts, the reaction of furfuryl alcohol with an alkyl silicate is very slow. At least when using crude products of tailings of the reaction of ethyl alcohol with tetrachlorosilane as reactant, however, it can be assumed that the reaction system will include a catalytically active concentration of hydrochloric acid (by-product of the reaction of ethyl alcohol with tetrachlorosilane). At the same time, however, acids catalyse the homocondensation of furfuryl alcohol, which proceeds at a fast rate and is difficult to control in terms of the composition of the products formed. A high fraction of homopolymers of furfuryl alcohol in the product of the process according to US 2,300,812 is also suggested by the brown or dark colour and the relatively high viscosity of the products obtained. The homocondensation of furfuryl alcohol produces water, which in turn brings about the hydrolysis of the alkyl silicate, with subsequent formation of polymeric silicates, which likewise contribute to the increase in the viscosity. In our own investigations it has been determined that such products are unsuitable for use as acid-curable binders for the production of foundry moulds and foundry cores.

DE 28 48 319 C3 discloses furfuryloxy-endblocked siloxanes of the formula

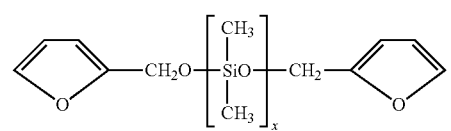

in which the value of x is about 2 to 100, preferably less than 25, and also their preparation and use as electrically insulating liquids.

The object of the present invention, therefore, is to overcome the disadvantages of the prior art and to provide a composition comprising furfuryl silicates and furfuryl alcohol that has a high fraction of furfuryl silicates with a low fraction of free furfuryl alcohol and also of homopolymers of furfuryl alcohol and polymeric silicates. In particular, despite a low fraction of free furfuryl alcohol, the compositions are to have a viscosity which is acceptable for use as acid-curable binders, especially for the production of foundry moulds and foundry cores. A further object of the present invention is that of providing a process for producing a composition of this kind, comprising furfuryl silicates and furfuryl alcohol, and also of providing a suitable catalyst for the selective conversion of furfuryl alcohol into furfuryl silicates.

This object is achieved in accordance with the invention by means of a composition comprising
(A) one or more compounds of the Formula (I)

$$Si[OR^1]_x[OR^2]_y[R^3]_z \qquad (I)$$

in which
x is an integer selected from 1, 2, 3 and 4
y and z are integers selected from 0, 1, 2 and 3, where z=0 in accordance with the invention
where x+y+z=4
each of the x structural units $R^1$ is furfuryl
and each of the y structural units $R^2$, independently of all other structural units $R^2$, is selected from the group of linear and branched alkyl radicals
and each of the z structural units $R^3$, independently of all other structural units $R^3$, is selected from the group of linear and branched alkyl radicals and of aryl radicals
(B) furfuryl alcohol $R^1$—OH
(C) one or more alkyl alcohols $R^2$—OH, where $R^2$ in each case is selected from the group of linear and branched alkyl radicals
(D) one or more compounds from the group consisting of alkoxides of elements from the group consisting of B, Al, Sn, Ti and Zr and organoelement compounds of elements from the group consisting of B, Al, Sn, Ti and Zr.

Further aspects of the invention relate to a process for producing a composition of the invention, to the use of a composition of the invention as acid-curable binder, to a reaction mixture comprising a composition of the invention, to a kit comprising a composition of the invention, and to a process for producing an article selected from the group consisting of foundry cores, foundry moulds and feeders.

Surprisingly it has been found that compounds from the group consisting of alkoxides of elements from the group consisting of B, Al, Sn, Ti and Zr and organoelement compounds of elements from the group consisting of B, Al, Sn, Ti and Zr (constituent (D) of the composition of the invention as defined in the claims) selectively catalyse the reaction of furfuryl alcohol with compounds from the group of alkyl esters of orthosilicic acid (alkyl silicates), of alkylalkoxysilanes (non-inventive), arylalkoxysilanes (non-inventive) and arylalkylalkoxysilanes (non-inventive), and of siloxanes to form compounds of the Formula (I), meaning that unwanted secondary reactions such as the homocondensation of the furfuryl alcohol occur only to a small degree, and a high yield of compounds of the Formula (I) is obtained.

Alkoxides of elements from the group consisting of B, Al, Sn, Ti and Zr in the sense of the present invention are compounds in which at least one alkoxy group is bonded via its oxygen atom to an atom of an element from the group consisting of B, Al, Sn, Ti and Zr.

Organoelement compounds of elements from the group consisting of B, Al, Sn, Ti and Zr in the sense of the present invention are compounds in which at least one carbon atom is linked to an atom of an element from the group consisting of B, Al, Sn, Ti and Zr. In the case of elements from the group consisting of Al, Sn, Ti and Zr, the compounds in question are organometallic compounds of the corresponding elements.

One aspect of the present invention lies in a composition of the invention as described in the claims.

A composition of the invention comprises (constituent (A)) one or more furfuryl silicates, i.e. one or more compounds of the Formula (I)

$$Si[OR^1]_x[OR^2]_y[R^3]_z \qquad (I)$$

in which
x is an integer selected from 1, 2, 3 and 4
y and z are integers selected from 0, 1, 2 and 3, where z=0 in accordance with the invention
where x+y+z=4
each of the x structural units $R^1$ is furfuryl
and each of the y structural units $R^2$, independently of all other structural units $R^2$, is selected from the group of linear and branched alkyl radicals, where linear alkyl radicals are preferred
and each of the z structural units $R^3$, independently of all other structural units $R^3$, is selected from the group of linear and branched alkyl radicals and of aryl radicals.

A compound of the Formula (I) is an ester of orthosilicic acid in which at least one acid function of the orthosilicic acid is esterified by furfuryl alcohol.

If in Formula (I) both y and z are zero (i.e. x=4), the compound of the Formula (I) is the tetrafurfuryl ester of orthosilicic acid (tetrafurfuryl silicate), i.e. all four acid functions of the orthosilicic acid are esterified by furfuryl alcohol.

If in Formula (I) z is zero and x and y are each integers selected from 1, 2 and 3, then the compound of the Formula (I) is a mixed ester of orthosilicic acid, in which at least one and at most three of the four acid functions of the orthosilicic acid are esterified by furfuryl alcohol, and the remaining acid functions of orthosilicic acid are esterified by alkyl alcohols $R^2$—OH, where the structural unit $R^2$ is selected from the group of linear and branched alkyl radicals, with linear alkyl radicals being preferred.

If in Formula (I) y is zero and x and z are each integers selected from 1, 2 and 3 (non-inventive), then the compound of the Formula (I) is a furfuryl ester of a substituted orthosilicic acid, in which at least one and at most three of the four acid functions of the orthosilicic acid are esterified by furfuryl alcohol, and the remaining acid functions of orthosilicic acid are substituted by structural units $R^3$ selected from the group of linear and branched alkyl radicals and of aryl radicals, with linear alkyl radicals being preferred.

If in Formula (I) x, y and z are each integers selected from 1 and 2 (non-inventive), then the compound of the Formula (I) is a mixed ester of a substituted orthosilicic acid, where at least one and at most two of the four acid functions of the orthosilicic acid are esterified by furfuryl alcohol, and at least one of the remaining acid functions of the orthosilicic acid is esterified by an alkyl alcohol $R^2$—OH, where the structural unit $R^2$ is selected from the group of linear and branched alkyl radicals, and at least one of the remaining acid functions of the orthosilicic acid is substituted by structural units $R^3$ selected from the group of linear and branched alkyl radicals and of aryl radicals.

If the compound of the Formula (I) contains two or more structural units $R^2$ (i.e. y is an integer selected from 2 and 3), then each of the y structural units $R^2$, independently of all other structural units $R^2$, is selected from the group of linear and branched alkyl radicals, i.e. the y structural units $R^2$ may be identical or different. Preferably all y structural units $R^2$ are linear alkyl radicals.

If the compound of the Formula (I) contains two or more structural units $R^3$ (i.e. z is an integer selected from 2 and 3, non-inventive), then each of the z structural units $R^3$, independently of all other structural units $R^3$, is selected from the group of linear and branched alkyl radicals and of aryl radicals, i.e. the z structural units $R^3$ may be identical to or different. Preferably all z structural units $R^3$ are linear alkyl radicals.

Constituent (A) of the composition of the invention consists preferably of those compounds of the Formula (I) in which
  each of the y structural units $R^2$, independently of all other structural units $R^2$, is selected from the group consisting of methyl, ethyl, propyl, isopropyl, butyl and isobutyl, where preferably all structural units $R^2$ are ethyl
  each of the z structural units $R^3$, independently of all other structural units $R^3$, is selected from the group consisting of methyl, ethyl, propyl, isopropyl, butyl and isobutyl, where preferably all structural units $R^3$ are ethyl
  one of y and z is an integer selected from 1, 2 and 3, and the other of y and z is 0, where z=0 in accordance with the invention.

Typically, in the composition of the invention, the constituent (A) is present in the form of a mixture of different compounds of the Formula (I).

The constituent (A) in the composition of the invention is preferably selected from the group consisting of
  the compound of the Formula (I) with x=4 and y=z=0,
  and those compounds of the Formula (I) in which
    y is an integer selected from 1, 2 and 3, and z=0,
    each of the y structural units $R^2$, independently of all other structural units $R^2$, is selected from the group consisting of methyl, ethyl, propyl, isopropyl, butyl and isobutyl, where preferably all structural units $R^2$ are ethyl.

In the composition of the invention, the constituent (A) is more preferably a mixture of
  the compound of the Formula (I) with x=4 and y=z=0,
  and one or more compounds of the Formula (I) in which
    y is an integer selected from 1, 2 and 3, and z=0,
    and each of the y structural units $R^2$, independently of all other structural units $R^2$, is selected from the group consisting of methyl, ethyl, propyl, isopropyl, butyl and isobutyl, where preferably all structural units $R^2$ are ethyl.

In the composition of the invention, the constituent (A) is very preferably a mixture of compounds of the Formula (I')

$$Si[OR^1]_x[OR^2]_y \qquad (I')$$

in which
  x is an integer selected from 1, 2, 3 and 4
  y in each compound of the Formula (I'), independently of the other compounds of the Formula (I') in the mixture, is an integer selected from 0, 1, 2 and 3
  where x+y=4
  and each of the y structural units $R^2$, independently of all other structural units $R^2$, is selected from the group consisting of methyl, ethyl, propyl, isopropyl, butyl and isobutyl, where preferably all structural units $R^2$ are ethyl.

A compound of the Formula (I') is an ester of orthosilicic acid in which one or more acid functions of the orthosilicic acid are esterified by furfuryl alcohol, and the remaining acid functions of the orthosilicic acid are esterified by alkyl alcohols $R^2$—OH from the group consisting of methanol, ethanol, propanol, isopropanol, butanol and isobutanol, where $R^2$ is preferably ethyl; or all acid functions of the orthosilicic acid are esterified by furfuryl alcohol.

In other words, in this particularly preferred case, constituent (A) is a mixture of the tetrafurfuryl ester of orthosilicic acid and various mixed furfuryl alkyl esters of orthosilicic acid, preferably mixed furfuryl ethyl esters of orthosilicic acid.

In the composition of the invention, the constituent (A) is especially preferably a mixture of compounds of the Formula (I')

$$Si[OR^1]_x[OR^2]_y \qquad (I')$$

in which
  x is an integer selected from 1, 2, 3 and 4
  y in each compound of the Formula (I'), independently of the other compounds of the Formula (I') in the mixture, is an integer selected from 0, 1, 2, and 3
  where x+y=4
  each of the x structural units $R^1$ is furfuryl
  and each of the y structural units $R^2$ is ethyl.

In this especially preferred case, constituent (A) is a mixture of the tetrafurfuryl ester of orthosilicic acid and various mixed furfuryl ethyl esters of orthosilicic acid.

Constituent (C) of the composition of the invention is preferably selected from the group consisting of methanol, ethanol, propanol, isopropanol, butanol and isobutanol.

Preferably
  constituent (A) of the composition of the invention is selected from the group consisting of
    the compound of the Formula (I) with x=4 and y=z=0,
    and those compounds of the Formula (I) in which
      y is an integer selected from 1, 2 and 3, and z=0,
      each of the y structural units $R^2$, independently of all other structural units $R^2$, is selected from the group consisting of methyl, ethyl, propyl, isopropyl, butyl and isobutyl, where preferably all structural units $R^2$ are ethyl,
and
  constituent (C) of the composition of the invention is selected from the group consisting of methanol, ethanol, propanol, isopropanol, butanol and isobutanol, where constituent (C) is preferably ethanol.

More preferably, in the composition of the invention,
  constituent (A) is a mixture of
    the compound of the formula (I) with x=4, and y=z=0,
    and one or more compounds of the Formula (I) in which
      y is an integer selected from 1, 2 and 3, and z=0,
      and each of the y structural units $R^2$, independently of all other structural units $R^2$, is selected from the group consisting of methyl, ethyl, propyl, isopropyl, butyl and isobutyl, where preferably all structural units $R^2$ are ethyl, and the constituent (C) is selected from the group consisting of methanol, ethanol, propanol, isopropanol, butanol and isobutanol, where constituent (C) is preferably ethanol.

Very preferably, in the composition of the invention, constituent (A) is a mixture of compounds of the formula (I')

$$Si[OR^1]_x[OR^2]_y \qquad (I')$$

in which
x is an integer selected from 1, 2, 3 and 4
y in each compound of the Formula (I'), independently of the other compounds of the Formula (I') in the mixture, is an integer selected from 0, 1, 2 and 3
where x+y=4
and each of the y structural units $R^2$, independently of all other structural units $R^2$, is selected from the group consisting of methyl, ethyl, propyl, isopropyl, butyl and isobutyl, where preferably all structural units $R^2$ are ethyl and constituent (C) is selected from the group consisting of methanol, ethanol, propanol, isopropanol, butanol and isobutanol, preferably ethanol.

Especially preferably, in the composition of the invention constituent (A) is a mixture of compounds of the Formula (I')

$$Si[OR^1]_x[OR^2]_y \qquad (I')$$

in which
x is an integer selected from 1, 2, 3 and 4
y in each compound of the Formula (I'), independently of the other compounds of the Formula (I') in the mixture, is an integer selected from 0, 1, 2, and 3
where x+y=4
each of the x structural units $R^1$ is furfuryl
and each of the y structural units $R^2$ is ethyl;
and the constituent (C) is ethanol.

Constituent (D) of the composition of the invention, particularly in the variants characterized herein as being preferred, is preferably selected from the group consisting of aluminium triisopropoxide, tri-n-butyl borate, tetra-n-butyl orthotitanate, tetraisopropyl titanate, tetrakis(2-ethylhexyl) titanate and dibutyltin dilaurate. Dibutyltin dilaurate is an organoelement compound in accordance with the definition indicated above, specifically an organometallic compound of tin. The other compounds stated here are alkoxides in accordance with the definition indicated above.

A composition of the invention preferably comprises
(B) a fraction of furfuryl alcohol in the range from 1% to 40%, preferably from 1% to 24%
(C) a total fraction of alkyl alcohols $R^2$—OH in the range from 0.5% to 10%
(D) a total fraction of elements from the group consisting of B, Al, Sn, Ti and Zr in the range from 0.01% to 0.5%
based in each case on the total mass of the composition of the invention.

For reasons of environmental and health protection, preference is given to compositions of the invention having a low fraction (preferably 24% or less, based on the total mass of the composition of the invention) of furfuryl alcohol (B). Surprisingly it has been found that even with a fraction of 24% or less (based on the total mass of the composition of the invention) of furfuryl alcohol (B), the viscosity of the composition is low enough to allow it to be worked in the customary way.

As a result of the low fraction of alkyl alcohols $R^2$—OH (C) in the composition of the invention, the transesterification of the furfuryl silicates of the Formula (I) to give alkyl esters of orthosilicic acid (compounds of the formula (II) as described in the claims), i.e. the reverse reaction to the inventive preparation of the furfuryl silicates of the Formula (I), is largely suppressed.

The concentration of constituent (D) may be determined by x-ray fluorescence analysis in a manner familiar to the skilled person.

Besides the constituents (A), (B), (C) and (D) defined in the claims, a composition of the invention may comprise further constituents, examples being constituents selected from the group consisting of
(E) adhesion promoters, the adhesion promoters (E) being preferably selected from the group of aminosilanes
and/or
(F) compounds comprising one or more phenol rings
(G) compounds from the group consisting of monoethylene glycol, diethylene glycol, polyethylene glycol and 1,2-propylene glycol
(H) surfactants.

The adhesion promoters (E) are preferably selected from the group of aminosilanes, more preferably from the group consisting of 3-aminopropylmethyldiethoxysilane, N-aminoethyl-3-aminopropyltrimethoxysilane, N-aminoethyl-3-aminopropylmethyldieth-oxysilane and 3-aminopropyltri-ethoxysilane.

Constituent (F) is selected from the group of compounds comprising one or more phenol rings, i.e. aromatic rings of 6 carbon atoms, with a hydroxyl group bonded to at least one of these carbon atoms. Constituent (F) is preferably selected from the group consisting of bisphenol A, cashew nut shell oil, components of cashew nut shell oil, more particularly cardol, cardanol and also derivatives and oligomers of these compounds as described in DE 10 2006 037288, tannins, lignins, natural polyphenols and phenol-formaldehyde resins. Phenol-formaldehyde resins are obtainable by polycondensation of formaldehyde with one or more phenols, with phenols being understood as aromatic hydroxy compounds having an aromatic ring of 6 carbon atoms, with a hydroxyl group bonded to at least one of these carbon atoms. Preferred are polycondensates of phenol (hydroxybenzene) with formaldehyde. The compounds of constituent (F) react, on acid curing of the composition of the invention, as comonomers with furfuryl alcohol and are incorporated into the resultant furan resins. It has emerged that this increases the strength of foundry moulds and foundry cores.

In certain cases (see below), a composition of the invention also comprises reaction products of compounds containing one or more phenol rings with compounds of the Formula (II) as defined in the claims.

Preferably, in the composition of the invention,
(E) the amount of adhesion promoters is 0.1% to 2.5%, preferably 0.2% to 0.5% and/or
(F) the amount of compounds containing one or more phenol rings is 0.1% to 10.0%, preferably 2.0% to 5.0% and/or
(G) the amount of compounds from the group consisting of monoethylene glycol, diethylene glycol, polyethylene glycol and 1,2-propylene glycol is 0.1% to 5.0%, preferably 0.5 to 1.0%
and/or
(H) the amount of surfactants is 0.1% to 2.0%, preferably 0.5% to 1.5% based in each case on the total mass of the composition of the invention.

Preferred is a composition of the invention which has
a water content of less than 0.2%
a formaldehyde content of less than 0.05%
a bonded-nitrogen content of less than 0.2% based in each case on the total mass of the composition of the invention.

The presence of water is undesirable, since silicic esters hydrolyse in the presence of water, and the hydrolysis products condense to form polymeric silicates. This would increase both the fraction of free furfuryl alcohol and the viscosity of the composition, which is undesirable for the reasons stated.

Relative to binder compositions used conventionally for the formation of furan resins, compositions of the invention are distinguished by the facts that they are substantially free (i.e. free apart from unavoidable impurities) from comonomers harmful to environment and health such as formaldehyde, and are substantially free (i.e. free apart from unavoidable impurities) from comonomers containing nitrogen atoms such as urea, for example. Especially for binders for producing foundry moulds and cores for iron and steel casting, particularly for stainless steel casting, the desirable overall nitrogen content is as low as possible, since in particular an overall nitrogen content of 4 wt % or higher in a no-bake binder may lead to casting defects. Examples of such casting defects are those known as pinholes (pin prick pores). These pinholes are formed when, during the casting operation, water vapour reacts with iron accompaniments and nitrogen-containing components to form metal oxides and nitrogen-hydrogen compounds, which diffuse into the liquid metal and result in micropore formation on the casting. For certain applications, however, addition of small amounts of nitrogen-containing adhesion promoters such as aminosilanes is preferred.

Compositions of the invention have a pale brown to brown colour and are translucent, in contrast to the furfuryl silicate-containing compositions obtainable by the process of US 2,300,812, which are dark brown to black and barely translucent. Without being tied to any theory, it is presently assumed that the pale translucent colouring and low viscosity of compositions of the invention are attributable to a relatively low fraction of homocondensation products of furfuryl alcohol and of polymeric silicates, as compared with the furfuryl silicate-containing compositions obtainable by the process of US 2,300,812.

At a furfuryl alcohol content of 24% to 40%, based on the total mass of the composition of the invention, the viscosity of preferred compositions of the invention is 50 mPas or less, measured to DIN 53019-1: 2008-09 (i.e. in accordance with DIN 53019-1 of September 2008), with a rotational viscometer at 20° C.

At a furfuryl alcohol content of 24% or less, based on the total mass of the composition of the invention, the viscosity of preferred compositions of the invention is 100 mPas or less, measured to DIN 53019-1: 2008-09 (i.e. in accordance with DIN 53019-1 of September 2008), with a rotational viscometer at 20° C.

The preferred ranges stated above for the viscosity are valid in particular for application as binders in the no-bake process. For other areas of application, such as for binders in the warm-box or hot-box process, higher viscosities are also acceptable.

Compositions of the invention preferably have a level of silicon dioxide bound substantially in furfuryl silicates of the Formula (I) in the range from 5% to 30%, based on the total mass of composition of the invention. The level of silicon dioxide is determined on the basis of the ignition residue formed on oxidative incineration of a sample of the composition of the invention at 900° C. (for details of determination of the ignition residue, reference may be made to the working examples). Since all other constituents of the composition of the invention (apart from constituent (D), which is present at relatively low concentration) are volatile and/or form gaseous combustion products under these conditions, the ignition residue consists substantially of silicon dioxide.

In the acid curing of binder compositions of the invention, the furfuryl silicates are first of all cleaved to form furfuryl alcohol and orthosilicic acid, and in the acid-catalysed polycondensation of the furfuryl alcohol, the orthosilicic acid is bound into the resultant polycondensation product. Relative to conventional furan resins, then, which contain no silicon fraction, the carbon content is reduced for a given mass of binder. Because orthosilicic acid is incorporated into the resultant polycondensation product, there is an increase in the thermal stability of the binder and a reduction in the odour nuisance from organic pollutant emissions when the binder is burned. The latter advantage is particularly relevant to the use of compositions of the invention as binders for the production of foundry moulds and foundry cores.

In their use as binders for the production of foundry moulds and foundry cores, therefore, compositions of the invention are notable for low pollutant and odour emissions, both during production of the foundry moulds and foundry cores and when used in the casting operation, since on the one hand the composition of the invention is substantially free of comonomers harmful to the environment and health, and the amount of furfuryl alcohol can be kept relatively low as well, and on the other hand the silicon fraction present reduces the carbon content for a given mass of binder, and so a smaller quantity of organic emissions is released when the binder is burned during the casting operation.

A further aspect of the present invention relates to a process for producing a composition of the invention (as defined in the claims). The process of the invention comprises the following step:

reaction of furfuryl alcohol
with one or more compounds of the Formula (II)

$$\mathrm{Si}[OR^2]_a[R^3]_b[OR^4]_c \quad \quad (II)$$

in which
a and c are integers selected from 0, 1, 2, 3 and 4, where one of a and c is greater than 0,
b is an integer selected from 0, 1, 2 and 3, where b=0 in accordance with the invention
where a+b+c=4,
each of the a structural units $R^2$, independently of all other structural units $R^2$, is selected from the group of linear and branched alkyl radicals,
each of the b structural units $R^3$, independently of all other structural units $R^3$, is selected from the group of linear and branched alkyl radicals and aryl radicals,
each of the c structural units $R^4$, independently of all other structural units $R^4$, is selected from the group of structural units of the formula (III)

$$-(\mathrm{Si}[OR^2]_d[R^3]_e-O)_n-\mathrm{Si}[OR^2]_f[R^3]_g \quad \quad (III)$$

in which
each of the d+f structural units $R^2$, independently of all other structural units $R^2$, is selected from the group of linear and branched alkyl radicals,
each of the e+g structural units $R^3$, independently of all other structural units $R^3$, is selected from the group of linear and branched alkyl radicals and of aryl radicals,
d and e are integers selected from 0, 1 and 2, where d+e=2, where d=2 and e=0 in accordance with the invention, f and g are integers selected from 0, 1, 2 and 3, where f+g=3, where f=3 and g=0 in accordance with the invention, n is an integer in the range from 1 to 10, at a temperature in the range from 80° C. to 150° C., preferably in the range from 100° C. to 120° C., in the presence of one or more compounds from the group consisting of alkoxides of elements from the group consisting of B, Al, Sn, Ti and Zr and organoelement compounds of elements from the group consisting of B, Al, Sn, Ti and Zr.

A compound of the Formula (II) is an ester of orthosilicic acid in which at least one of the four acid functions of the orthosilicic acid is esterified by an alkyl alcohol $R^2$—OH, where the structural unit $R^2$ is selected from the group of linear and branched alkyl radicals, where linear alkyl radicals are preferred.

If in Formula (II) both b and c are zero, the compound (II) is a tetraalkyl ester of orthosilicic acid, i.e. all four acid functions of the orthosilicic acid are esterified by alkyl alcohols $R^2$—OH, where the structural unit $R^2$ is selected from the group of linear and branched alkyl radicals, where linear alkyl radicals are preferred.

If in Formula (II) c is zero, and a and b are each integers selected from 1, 2 and 3 (non-inventive), then the compound (II) is an alkyl ester of a substituted orthosilicic acid, where at least one and at most three of the four acid functions of the orthosilicic acid are esterified by alkyl alcohols $R^2$—OH, where the structural unit $R^2$ is selected from the group of linear and branched alkyl radicals, and the remaining acid functions of the orthosilicic acid are substituted by structural units $R^3$ selected from the group of linear and branched alkyl radicals and of aryl radicals. Depending on the nature of the structural units $R^3$, these compounds may also be characterized as alkyalkoxysilanes, arylalkoxysilanes or arylalkylalkoxysilanes, respectively.

If in Formula (II) c>0, where preferably c=1, the compound of the Formula (II) is a siloxane.

If the compound of the Formula (II) contains two or more structural units $R^2$ (i.e. a is an integer selected from 2, 3 and 4), then each of the a structural units $R^2$, independently of all other structural units $R^2$, is selected from the group of linear and branched alkyl radicals, i.e. the a structural units $R^2$ may be identical or different. Preferably all a structural units $R^2$ are linear alkyl radicals.

If the compound of the Formula (II) contains two or more structural units $R^3$ (i.e. b is an integer selected from 2 and 3, non-inventive), then each of the b structural units $R^3$, independently of all other structural units $R^3$, is selected from the group of linear and branched alkyl radicals (where linear alkyl radicals are preferred) and of aryl radicals, i.e. the b structural units $R^3$ may be identical or different. Preferably all b structural units $R^3$ are linear alkyl radicals.

If the compound of the Formula (II) contains two or more structural units $R^4$ (i.e. c is an integer selected from 2 and 4), then each of the c structural units $R^4$, independently of all other structural units $R^4$, is selected from the group of structural units of the Formula (III), i.e. the c structural units $R^4$ may be identical or different. Customarily, however, the the compound of the Formula (II) contains no more than one structural unit $R^4$.

Each structural unit $R^4$ of the Formula (III) contains n*d+f structural units $R^2$ and n*e+g structural units $R^3$, where d=2, e=0, and g=0 in accordance with the invention.

The compounds of the Formula (II) are preferably selected from the group consisting of (i) those compounds of the Formula (II) in which each of the a structural units $R^2$, independently of all other structural units $R^2$, is selected from the group consisting of methyl, ethyl, propyl, isopropyl, butyl and isobutyl, where preferably all structural units $R^2$ are ethyl, each of the b structural units $R^3$, independently of all other structural units $R^3$, is selected from the group consisting of methyl, ethyl, propyl, isopropyl, butyl and isobutyl, where preferably all structural units $R^3$ are ethyl, a is an integer selected from 1, 2, 3 and 4, b is an integer selected from 0, 1, 2, and 3, c=0, where a=4 and b=0 in accordance with the invention; and (ii) those compounds of the Formula (II) in which each of the a structural units $R^2$, independently of all other structural units $R^2$, is selected from the group consisting of methyl, ethyl, propyl, isopropyl, butyl and isobutyl, where preferably all structural units $R^2$ are ethyl, a=3, b=0, c=1, $R^4$ is selected from the group consisting of those structural units of the Formula (III) in which $R^2$ is selected from the group consisting of methyl, ethyl, propyl, isopropyl, butyl and isobutyl, where preferably all structural units $R^2$ are ethyl, d=2 and e=0, f=3 and g=0, n is an integer in the range from 1 to 10.

With particular preference in case (i), the compounds of the Formula (II) are selected from the group consisting of those compounds of the Formula (II) in which a=4 and b=c=0, each of the a structural units $R^2$, independently of all structural units $R^2$, is selected from the group consisting of methyl, ethyl, propyl, isopropyl, butyl and isobutyl, where preferably all structural units $R^2$ are ethyl.

Especially preferred in case (i) are compounds of the Formula (II')

$$Si[OR^2]_4 \qquad\qquad (II')$$

in which each of the four structural units $R^2$, independently of all other structural units $R^2$, is selected from the group consisting of methyl, ethyl, propyl, isopropyl, butyl and isobutyl, where preferably all structural units $R^2$ are ethyl.

A compound of the Formula (II') is a tetraalkyl ester of orthosilicic acid, i.e. an ester of orthosilicic acid in which all acid functions of the orthosilicic acid are esterified by alkyl alcohols $R^2$—OH from the group consisting of methanol, ethanol, propanol, isopropanol, butanol and isobutanol, where $R^2$ is preferably ethyl.

Especially preferably in case (i), each of the four structural units $R^2$ in Formula (II') is ethyl, i.e. the compound of the Formula (II) is tetraethyl orthosilicate (TEOS).

With particular preference in case (ii), the compounds of the Formula (II) are selected from the group consisting of those compounds of the Formula (II) in which a=3 and b=0 and c=1, each of the a structural units $R^2$, independently of all other structural units $R^2$, is selected from the group consisting of methyl, ethyl, propyl, isopropyl, butyl and isobutyl, where preferably all structural units $R^2$ are ethyl, and in the structural unit $R^4$ n is an integer in the range from 1 to 10, d=2 and e=0, f=3 and g=0, each of the 2n+3 structural units $R^2$, independently of all other structural units $R^2$, is selected from the group consisting of methyl, ethyl, propyl, isopropyl, butyl and isobutyl, where preferably all structural units $R^2$ are ethyl.

Especially preferred in case (ii) are compounds of the Formula (II")

$$Si[OR^2]_3[OR^4] \quad (II")$$

in which each of the three structural units $R^2$, independently of all other structural units $R^2$, is selected from the group consisting of methyl, ethyl, propyl, isopropyl, butyl and isobutyl, where preferably all structural units $R^2$ are ethyl, and the structural unit $R^4$ is a structural unit of the Formula (III')

$$—(Si[OR^2]_2—O)_n—Si[OR^2]_3 \quad (III')$$

in which n is an integer in the range from 1 to 10, each of the 2n+3 structural units $R^2$, independently of all other structural units $R^2$, is selected from the group consisting of methyl, ethyl, propyl, isopropyl, butyl and isobutyl, where preferably all structural units $R^2$ are ethyl.

Compounds of the Formula (II") contain 2n+6 structural units $R^2$, where each of the 2n+6 structural units $R^2$, independently of all other structural units $R^2$, is selected from the group consisting of methyl, ethyl, propyl, isopropyl, butyl and isobutyl, where preferably all structural units $R^2$ are ethyl.

Especially preferably in case (ii), each of the 2n+6 structural units $R^2$ in Formula (II") is ethyl, i.e. the compound of the Formula (II) is an ethoxysiloxane (ethyl polysilicate). Particularly preferred here is an ethoxysiloxane (ethyl polysilicate) having an arithmetic $SiO_2$ content of 40% (by mass), obtainable for example as Dynasil® 40 from Evonik.

In the process of the invention, furfuryl alcohol is preferably reacted with one or more compounds of the Formula (II) in the presence of one or more compounds selected from the group consisting of aluminium triisopropoxide, tri-n-butyl borate, tetra-n-butyl orthotitanate, tetraisopropyl titanate, tetrakis(2-ethylhexyl) titanate and dibutyltin dilaurate.

In the process of the invention, preference is given to using an amount of substance of 1 mol to 5 mol of furfuryl alcohol per mole of silicon bonded in the compounds of the Formula (II).

In the process of the invention, preference is given to using a total amount of substance of 0.001 mol to 0.05 mol of compounds from the group consisting of alkoxides of elements from the group consisting of B, Al, Sn, Ti and Zr and organoelement compounds of elements from the group consisting of B, Al, Sn, Ti and Zr per mole of silicon bonded in the compounds of the Formula (II).

With particular preference, in the process of the invention, an amount of substance of 1 mol to 5 mol of furfuryl alcohol per mole of silicon bonded in the compounds of the Formula (II) is used and a total amount of substance of 0.001 mol to 0.05 mol of compounds from the group consisting of alkoxides of elements from the group consisting of B, Al, Sn, Ti and Zr and organoelement compounds of elements from the group consisting of B, Al, Sn, Ti and Zr per mole of silicon bonded in the compounds of the Formula (II) is used, preference being given to compounds from the group consisting of aluminium triisopropoxide, tri-n-butyl borate, tetra-n-butyl orthotitanate, tetraisopropyl titanate, tetrakis(2-ethylhexyl) titanate and dibutyltin dilaurate.

In implementing the process of the invention it is preferred for alkyl alcohols $R^2$—OH, formed in the reaction of furfuryl alcohol with one or more compounds of the Formula (II), to be removed by distillation. Through the distillative removal of the alkyl alcohols $R^2$—OH formed, the reverse reaction to the inventive preparation of the furfuryl silicates of the Formula (I), i.e. the transesterification of the resulting furfuryl silicates of the Formula (I) to give compounds of the Formula (II), is largely suppressed.

With particular preference in accordance with the invention the reaction of furfuryl alcohol with one or more compounds of the Formula (II) (these compounds being selected preferably from the compounds of the Formula (II) characterized above as being preferred) takes place in the presence of one or more compounds from the group consisting of alkoxides of elements from the group consisting of B, Al, Sn, Ti and Zr and organoelement compounds of elements from the group consisting of B, Al, Sn, Ti and Zr (these compounds preferably being selected from the compounds of this group that were characterized above as being preferred) initially in a first phase under atmospheric pressure at temperatures up to 120° C., until under these conditions the flow of distillate comes to a standstill, after which, in a subsequent, second phase, the pressure is lowered to a level in the range from 10 kPa (100 mbar) to 80 kPa (800 mbar) and the distillation is continued.

A process for producing a composition of the invention which as well as the constituents (A), (B), (C) and (D) defined in the claims comprises further constituents comprises, before or after the reaction of furfuryl alcohol with one or more compounds of the Formula (II), the following step:

adding one or more further constituents, selected for example from the group consisting of (E) adhesion promoters (F) compounds containing one or more phenol rings (G) compounds from the group consisting of monoethylene glycol, diethylene glycol, polyethylene glycol and 1,2-propylene glycol (H) surfactants.

For preferred adhesion promoters (E) and preferred compounds (F), respectively, the observations above are valid.

Adhesion promoters (E) and surfactants (H) are added preferably after the reaction of furfuryl alcohol with one or more compounds of the Formula (II).

Compounds (F) are added before or after the reaction of furfuryl alcohol with one or more compounds of the Formula (II). Where the addition of a compound (F) is made before the reaction of furfuryl alcohol with one or more compounds of the Formula (II), the compound (F) is added preferably in the form of a solution of this compound in furfuryl alcohol. Where the addition of compounds (F) containing one or more phenol rings is made before the reaction of furfuryl alcohol with one or more compounds of the Formula (II), then, in the process of the invention, as well as the compounds of the Formula (I) formed by reaction of the compounds of the Formula (II) with furfuryl alcohol, there are also reaction products formed between compounds of the Formula (II) and compounds (F) containing one or more phenol rings.

In certain cases a process for producing a composition of the invention, after the reaction of furfuryl alcohol with one or more compounds of the Formula (II), comprises the following step:

Adding further furfuryl alcohol (B) and/or further alkyl alcohol (C), more particularly ethanol.

A further aspect of the present invention relates to the use of compounds from the group consisting of alkoxides of elements from the group consisting of B, Al, Sn, Ti and Zr and organoelement compounds of elements from the group consisting of B, Al, Sn, Ti and Zr as catalysts for the reaction of furfuryl alcohol with compounds of the Formula (II) as defined in the claims. For preferred compounds from the group consisting of alkoxides of elements from the group consisting of B, Al, Sn, Ti and Zr and organoelement compounds of elements from the group consisting of B, Al, Sn, Ti and Zr, the observations above are valid.

A further aspect of the present invention relates to a reaction mixture, especially for forming an acid-cured binder, comprising (i) a composition of the invention as described in the claims and (ii) an activator comprising
  (a) one or more acids from the group consisting of sulfonic acids and to phosphoric acid
  (b) optionally one or more acids from the group of carboxylic acids
  (c) water and
  (d) optionally one or more compounds from the group consisting of monoethylene glycol, diethylene glycol, polyethylene glycol and 1,2-propylene glycol.

Component (i) of the reaction mixture of the invention is a composition of the invention which functions as acid-curable binder. Component (ii) of the reaction mixture of the invention, the activator, comprises an acid which brings about the acid curing of the acid-curable binder in the form of the composition of the invention to give an acid-cured binder.

Component (i) of the reaction mixture of the invention is preferably selected from the compositions of the invention characterized above as being preferred.

Preferably, in component (ii) of the reaction mixture of the invention,
a) the sulfonic acids are selected from the group consisting of para-toluenesulfonic acid, xylenesulfonic acid, benzenesulfonic acid, cumenesulfonic acid, methanesulfonic acid and phenolsulfonic acid
and/or
b) the carboxylic acids are selected from the group consisting of benzoic acid, lactic acid, citric acid, phthalic acid, 2,4-dihydroxybenzoic acid and salicylic acid.

Component (ii) is not debarred from containing sulfuric acid as well as the aforesaid constituents.

Preferably, in component (ii), the concentration of bonded sulfur is 12% or less, based on the total mass of component (ii). A low sulfur fraction in the activator is advantageous because of the diminishment of emissions harmful to environment and health.

In one particularly preferred embodiment, a reaction mixture of the invention further comprises (iii) one or more refractory granular substances, preferably in an amount of 80% or more, preferably 95% or more, based on the total mass of the components (i), (ii) and (iii) of the reaction mixture.

A preferred reaction mixture of this kind is, for example, a moulding mixture for producing an article selected from the group consisting of feeders, foundry cores and foundry moulds. Component (iii) in this system is the mould raw material of the moulding mixture. Suitable mould raw materials are known to the skilled person. As mould raw material it is common to use washed, classified silica sand, but also other moulding materials such as, for example, zircon sands, chromite sands, schamottes, olivine sands, feldspar-containing sands and andalusite sands. Use is commonly made of regenerated mould raw materials (waste sands), which have been recovered through processing of foundry moulds and cores that have already been used. Corresponding processes are known to the skilled person.

Surprisingly it has emerged that for the acid curing of moulding mixtures of the invention, in comparison to moulding mixtures with conventional acid-curable binders, it is possible to use smaller amounts of activator, and also activators with a lower acid content and/or with less corrosive acids (e.g. para-toluenesulfonic acid instead of sulfuric acid), without adversely affecting the strength of the mouldings bound with the acid-cured binder. Because the acids customarily used in the activators (e.g. sulfuric acid, para-toluenesulfonic acid) contain sulfur, the lower acid fraction of the activator and/or the lower amount of activator diminishes the input of sulfur into the moulding mixture. A lower sulfur fraction in the moulding mixture is advantageous on account of the reduction in emissions harmful to environment and health. Another advantage is that the low sulfur fraction in the moulding mixture of the invention reduces the accumulation of sulfur in the circuit for regeneration of the waste mould raw material (waste sand) from spent foundry moulds and/or foundry cores. A high sulfur fraction in the mould raw material or in the moulding mixture raises the risk of casting defects such as graphite degeneration, for example.

A further aspect of the present invention relates to a kit, especially for forming an acid-cured binder, comprising (i) a composition of the invention as described in the claims (ii) an activator as described above where the components (i) and (ii) are arranged in the kit in such a way that no constituent of component (i) is able to react with a constituent of the component (ii).

Component (i) of the kit of the invention is a composition of the invention which functions as acid-curable binder. Component (ii) of the kit of the invention, the activator, comprises an acid which brings about the acid curing of the acid-curable binder in the form of the composition of the invention to give an acid-cured binder.

Component (i) of the kit of the invention is preferably selected from the compositions of the invention characterized above as being preferred. Component (ii) of the kit of the invention is preferably selected from the activators characterized above as being preferred.

Within the kit of the invention, reactive contact between constituents of component (i) and constituents of component (ii) is debarred, through the provision, for example, of component (i) on the one hand and of component (ii) on the other hand each in a separate container, or through the provision of component (i) on the one hand and of component (ii) on the other hand each in a separate chamber of a container.

When the two components (i) and (ii) of the kit of the invention are combined, the result is a reaction mixture of the invention as described above. The two components (i) and (ii) are preferably combined in the presence of
- (iii) one or more refractory granular substances, preferably in an amount of 80% or more, preferably 95% or more, based on the total mass of the components (i), (ii) and (iii) of the reaction mixture, to form a moulding mixture of the invention as described above.

Component (i) of the reaction mixture of the invention is preferably selected from the compositions of the invention characterized above as being preferred. Component (ii) of the reaction mixture of the invention is preferably selected from the activators characterized above as being preferred.

A further aspect of the present invention relates to a process for producing an article from the group consisting of feeders, foundry cores and foundry moulds, comprising
producing a moulding mixture comprising
- (i) a composition of the invention as described in the claims
- (ii) an activator as described above
- (iii) one or more refractory granular substances, moulding the moulding mixture
curing the composition (i) by the activator (ii).

Processes for shaping moulding mixtures for producing an article from the group consisting of feeders, foundry cores and foundry moulds are known to the skilled person.

The curing of the composition (i) by the activator (ii) in the shaped moulding mixture is accomplished preferably by a process from the group consisting of
- no-bake processes
- warm-box processes
- hot-box processes.

The curing of furan resins (binders containing furfuryl alcohol) by the hot-box process, the warm-box process and the no-bake process, respectively, is known to the skilled person.

In the case of the warm-box process, the binder is cured at temperatures in the range from 150° C. to 200° C. by activators containing organic sulfonic acids (e.g. paratoluenesulfonic acid, phenolsulfonic acid and the like). With the warm-box process, high strengths are attainable with relatively low temperatures and low binder quantities.

In the case of the no-bake process, the binder is cured without supply of heat, through the addition of the activator, which contains organic sulfonic acids in a mixture with sulfuric acid, and the process is relatively slow.

A further aspect of the present invention relates to the use of a composition of the invention as acid-curable binder
for a moulding mixture for producing an article selected from the group consisting of foundry cores and foundry moulds,
in the 3D printing process (three-dimensional printing),
for a putty or a sealant for use in the construction industry, preferably in acid-protection construction.

The production of an article selected from the group consisting of feeders, foundry cores and foundry moulds using the composition of the invention as acid-curable binder takes place by the process of the invention as described above.

In the case of the 3D printing process, a shaped body is constructed by three-dimensional printing from a moulding mixture of the invention (as described above). Corresponding technologies are known to the skilled person.

Putties or sealants for use in acid-protection construction (also referred to as acid-resistant cements) serve for the laying and jointing of silicate-ceramic and carbon-ceramic blocks, slabs and mouldings which, as protective coverings on floors, in channels, ducts, containers, and so on, protect them against attack by acids (with the exception of hydrofluoric acid). Acid-resistant cements comprise a putty flour and also a binder and an activator to bring about the curing of the binder. Where the composition of the invention is used as a binder for an acid-resistant cement, it is cured by means of an activator comprising an acid.

The invention is elucidated in more detail hereinafter by examples.

EXAMPLES

1. Production of inventive compositions by reaction of furfuryl alcohol with a compound of the Formula (II)
    1.1 Tetraethyl orthosilicate as compound of the Formula (II)

Product P1

A reaction vessel equipped with reflux condenser, thermometer and stirrer is charged with 150 g of furfuryl alcohol (FA), 100 g of tetraethyl orthosilicate (TEOS) and 2 g of tetrabutyl titanate. At the start of reaction the amount of substance ratio n(FA): n(Si bound in TEOS) is 3.2:1.0. With stirring, the mixture is heated within 8 minutes to 109° C., at which point it starts to boil. The temperature is raised continuously within 45 minutes to 120° C. and a total of 48 ml of volatile constituents are distilled off. Then the heating is removed and the pressure is cautiously lowered to 700 mbar. During this procedure the temperature falls briefly to around 97° C. The pressure is then lowered further down to around 400 mbar, and at the same time the temperature is raised continuously over the course of 25 minutes to 120° C. in order to distil off further volatile constituents (around 32 ml). The product obtained has a brownish colour and is clear and translucent. The yield of non-volatile product (following the distillative removal of the volatile constituents) is around 70%, based on the total mass of furfuryl alcohol, tetraethyl orthosilicate and tetrabutyl titanate introduced.

Product P2

A reaction vessel equipped with reflux condenser, thermometer and stirrer is charged with 150 g of furfuryl alcohol (FA), 100 g of tetraethyl orthosilicate (TEOS) and 3 g of tetrabutyl titanate. At the start of reaction the amount of substance ratio n(FA): n(Si bound in TEOS) was 3.2:1.0. With stirring, the mixture is heated within 2 minutes to 37° C. and the pressure is lowered to 400 mbar in order to distil off volatile constituents. The pressure is then lowered further down to around 350 mbar, and at the same time the temperature is raised continuously within 45 minutes to 110° C. in order to distil off further volatile constituents (around 76 ml). The product obtained has a brownish colour and is clear and translucent. The yield of non-volatile product (following the distillative removal of the volatile constituents) is around 76%, based on the total mass of furfuryl alcohol, tetraethyl orthosilicate and tetrabutyl titanate introduced.

Product P3

A reaction vessel equipped with reflux condenser, thermometer and stirrer is charged with 800 g of furfuryl alcohol (FA), 800 g of tetraethyl orthosilicate (TEOS) and 4 g of tetrabutyl titanate. At the start of reaction the amount of substance ratio n(FA): n(Si bound in TEOS) was 2.1:1.0. With stirring, the mixture is heated within 20 minutes to 100° C. and within a further 80 minutes continuously to 120° C. 246 g of volatile constituents are distilled off in this procedure. Then the heating is removed and the pressure is cautiously lowered to 210 mbar. During this procedure the temperature falls to around 85° C. The pressure is then held constant at 210 mbar, and at the same time the temperature is raised continuously within 60 minutes to 120° C. in order to distil off further volatile constituents. The product obtained has a brownish colour and is clear and translucent. The yield of non-volatile product (following the distillative removal of the volatile constituents) is around 76%, based on the total mass of furfuryl alcohol, tetraethyl orthosilicate and tetrabutyl titanate introduced.

1.2 Ethyl Polysilicate as Compound of the Formula (II)

Product P4

A reaction vessel equipped with reflux condenser, thermometer and stirrer is charged with 800 g of furfuryl alcohol (FA), 800 g of ethyl polysilicate (EPS) having an arithmetic $SiO_2$ content of 40% (obtainable as Dynasil® 40 from Evonik) and 4 g of tetrabutyl titanate. At the start of reaction the amount of substance ratio n(FA): n(Si bound in EPS) is 1.53:1.0. With stirring, the mixture is heated within 15 minutes to 103° C., at which point it starts to boil. The temperature is raised continuously within 50 minutes to 120° C. and a total of 236 g of volatile constituents are distilled off. Then the heating is removed and the pressure is cautiously lowered to 210 mbar. During this procedure the temperature falls to around 85° C. The pressure is then held constant at 210 mbar, and at the same time the temperature is raised continuously within 50 minutes to 120° C. in order to distil off further volatile constituents. The product obtained has a brownish colour and is clear and translucent. The yield of non-volatile product (following the distillative removal of the volatile constituents) is around 77%, based on the total mass of furfuryl alcohol, ethyl polysilicate and tetrabutyl titanate introduced.

Product P5

A reaction vessel equipped with reflux condenser, thermometer and stirrer is charged with 150 g of a solution of phenol-formaldehyde novolac (constituent (F) as defined above) at 30% in furfuryl alcohol, 150 g of ethyl polysilicate (EPS) having an arithmetic $SiO_2$ content of 40% (obtainable as Dynasil® 40 from Evonik) and 3 g of dibutyltin laurate (DBTL). At the start of reaction, the amount of substance ratio n(FA): n(Si bound in EPS) is 1.53:1.0. With stirring, the mixture is heated to 127° C. within 15 minutes and continuously to 140° C. within a further 45 minutes and the temperature is subsequently held constant at 140° C. 60 ml of volatile constituents are distilled off in this procedure. The product obtained has a reddish-brown colour and is clear and translucent. The yield of non-volatile product (after the distillative removal of the volatile constituents) is around 83%, based on the total mass of phenol-formaldehyde novolac, furfuryl alcohol, ethyl polysilicate and dibutyltin laurate introduced.

1.3 Addition of Further Constituents

Product P6

96.1 Parts of the product P1 prepared as described above were mixed with 3.5 parts of ethanol and 0.4 part of an aminosilane (obtainable as Dynasylan 1505 from Evonik) suitable as an adhesion promoter (constituent (E) as defined above).

Product P7

73.7 Parts of the product P1 prepared as described above were mixed with 22.4 parts of a solution of bisphenol A (constituent (F) as defined above) in furfuryl alcohol (with the solution containing 4.48 parts of bisphenol A), 3.5 parts of ethanol and 0.4 part of an aminosilane (obtainable as Dynasylan 1505 from Evonik) suitable as an adhesion promoter (constituent (E) as defined above).

Product P8

96.1 Parts of the product P2 prepared as described above were mixed with 3.5 parts of ethanol and 0.4 part of an aminosilane (obtainable as Dynasylan 1505 from Evonik) suitable as an adhesion promoter (constituent (E) as defined above).

Products P9 to P14

Further inventive products P9 to P14 were prepared by adding the amounts of further constituents as specified in Table 1 to the amount as specified in Table 1 of the product P1 prepared as described above.

TABLE 1

|  | P9 | P10 | P11 | P12 | P13 | P14 |
|---|---|---|---|---|---|---|
| Furfuryl alcohol |  | 8.80 | 9.30 | 9.30 | 9.30 | 9.30 |
| Product P1 | 99.50 | 87.20 | 84.40 | 83.40 | 83.40 | 83.40 |
| Bisphenol A |  |  | 2.30 | 2.30 | 2.30 | 2.30 |
| Ethanol |  | 3.50 | 3.50 | 3.50 | 3.50 | 3.50 |
| Aminosilane | 0.50 | 0.50 | 0.50 | 0.50 | 0.50 | 0.50 |
| Surfactant 1 |  |  |  | 1.00 |  |  |
| Surfactant 2 |  |  |  |  | 1.00 |  |
| Surfactant 3 |  |  |  |  |  | 1.00 |

2. Non-Inventive, Comparative Products

Comparative Product C1

The non-inventive, comparative product C1, investigated for purposes of comparison, has the composition, based on its total mass, as follows (Table 2):

TABLE 2

| Cold resin A (for composition see below) | 56.0 wt % |
|---|---|
| Monomeric furfuryl alcohol | 41.3 wt % |
| Water | 2.5 wt % |
| Aminosilane | 0.2 wt % |

Comparative product C1 was prepared by introducing the constituents identified in Table 2 into a reactor, with stirring, and carrying out mixing for 15 minutes.

To prepare the cold resin A, a reactor is charged with 489.9 kg of furfuryl alcohol, 63.0 kg of urea, 158.8 kg of 91% paraformaldehyde, 35.6 kg of water and 49.5 kg of ethanol and this initial charge is intensively mixed. Then 4.8 kg of 85% formic acid are added and the resulting mixture is heated to 90° C. At intervals of around 30 minutes in each case, a further 62.9 kg of urea are added in portions at 90° C. This reaction mixture is subsequently cooled a little and 113.1 kg of furfuryl alcohol are added. Eventually, after further cooling to 50° C., a pH in the range from 8.1 to 8.8 is established by addition of 25% ammonia in water. Throughout the process, the reactor contents are stirred. The product thus obtained is referred to here as cold resin A. The chemical and physical parameters of the cold resin A are as follows (Table 3):

TABLE 3

| Water content (determined by Karl-Fischer titration) | 13.5 wt % |
|---|---|
| Total nitrogen content (determined by elemental analysis) | 6.2 wt % |
| Formaldehyde content (determined by titration by the KCN method) | 0.1 wt % |
| Viscosity at 20° C. (determined using rotary viscometer) | 95 mPa*s |

Comparative Product C2

The non-inventive, comparative product C2, investigated for purposes of comparison, has the composition, based on its total mass, as follows (Table 4):

TABLE 4

| 1 | Furfuryl alcohol | 82.38 wt % |
|---|---|---|
| 2 | Bisphenol A | 13.0 wt % |
| 3 | Resorcinol | 3.0 wt % |
| 4 | Formaldehyde solution 49% strength in water | 1.0 wt % |
| 5 | Surfactant | 0.12 wt % |
| 6 | Aminosilane | 0.5 wt % |

Comparative product C2 was prepared by introducing the constituents 1-4 into a reactor, with stirring, and carrying out mixing for 30 minutes. Thereafter constituents 5 and 6 are added and the resulting mixture is mixed for a further 15 minutes.

3. Chemical Characterization

Data on the chemical composition of inventive products P1 to P5 and comparative products C1 and C2 is compiled in Table 5.

TABLE 5

| | Free furfuryl alcohol [%] | Free formaldehyde [%] | Free resorcinol [%] | Free bisphenol A [%] | Water content [%] | Free ethanol [%] | Nitrogen fraction [%] | Ignition residue 1 h/900° C. [%] | Titanium or tin content [%] |
|---|---|---|---|---|---|---|---|---|---|
| P1 | 9.6 | 0.0 | 0.0 | 0.0 | 0.0 | 3.0 | 0.0 | 16.0 | 0.16 Ti |
| P2 | 22.9 | 0.0 | 0.0 | 0.0 | 0.0 | n.d. | 0.0 | 15.0 | 0.22 Ti |
| P3 | 7.1 | 0.0 | 0.0 | 0.0 | 0.0 | 1.4 | 0.0 | 26.5 | 0.18 Ti |
| P4 | 4.7 | 0.0 | 0.0 | 0.0 | 0.0 | 0.8 | 0.0 | 10.0 | 0.05 Ti |
| P5 | 13.3 | 0.0 | 0.0 | 0.0 | 0.0 | n.d. | 0.0 | n.d | 0.22 Sn |
| C1 | 65.0 | 0.10 | 0.0 | 0.0 | 10.0 | 3.0 | 3.5 | <0.1 | 0.0 |
| C2 | 79.3 | 0.10 | 2.3 | 13.6 | 0.60 | n.n. | n.n. | <0.1 | 0.0 |

In Table 5, for the invention products P1 to P5, the concentration figures for free furfuryl alcohol (constituent (B)) and ethanol (constituent (C)) are based on the total mass of the non-volatile product obtained after the distillative removal of the volatile constituents as described above in Sections 1.1 and 1.2.

The amount of titanium or tin in the products P1 to P5 was calculated on the basis of the amount of tetrabutyl titanate or dibutyltin laurate used, respectively, on the at least approximately accurate assumption that on the distillative removal of the volatile constituents virtually no tetrabutyl titanate or dibutyltin laurate is removed from the reaction system.

In the comparative products C1 and C2, all concentration figures in Table 5 are based on the total mass of the comparative product C1 or C2 prepared by mixing the constituents listed in Table 2 or Table 4, respectively, as described in Section 2 above.

In Table 5 "0.0" means that the constituent in question was not present, "n.n" denotes "not detectable" and "n.d." denotes "not determined", meaning that there was no analysis for the constituent in question.

The concentrations of furfuryl alcohol, resorcinol, bisphenol A and ethanol were determined by gas chromatography, the water content by Karl-Fischer titration, the free formaldehyde content by titration by the KCN method. The nitrogen fraction was determined by elemental analysis.

Relative to conventional acid-curable binders (comparative products C1 and C2), the inventive compositions (products P1 to P5) are notable for a substantially lower free furfuryl alcohol content, and they contain neither nitrogen nor free formaldehyde.

The ignition residue was determined for the inventive products P1 to P4 and the comparative products C1 and C2. For this purpose, a burner was used for oxidative preincineration of a sample, which was subsequently calcined at 900° C. in a porcelain crucible to constant mass, but for at least one hour. Because the ingredients that are volatile on calcination are mostly organic in nature, the ignition residue is a measure of the content of those constituents which on incineration form non-volatile inorganic compounds. For the compositions of the invention, the ignition residue comprises essentially silicon dioxide formed in the thermal decomposition of compounds of the Formula (I).

The inventive products P1 to P4 therefore form an ignition residue which in terms of quantity corresponds approximately to the fraction of bound silicon dioxide in the compounds of the Formula (I) present. The formation of a relatively large amount of ignition residue in the case of the inventive products P1 to P3 (produced with tetraethyl orthosilicate as compound of the Formula (II); see above) is an indication that in these products there are reaction products (compounds of the Formula (I)) formed by reaction of furfuryl alcohol with tetraethyl orthosilicate (compound of the Formula (II)). They are therefore not mere mixtures of furfuryl alcohol and tetraethyl orthosilcate, since under the conditions under which the ignition residue is determined, tetraethyl orthosilicate escapes virtually without residue.

The comparative products C1 and C2 formed a very small ignition residue, since they consist essentially of organic constituents.

For further resolution of the structure of the reaction products formed by reaction of furfuryl alcohol with tetraethyl orthosilicate, the inventive products P1 and P3 were analysed by gel permeation chromatography (GPC). In parallel to this, the non-inventive, comparative products C1 and C2 were also analysed by GPC. The chromatograms of all the products investigated are shown in FIG. 1. In this figure there are the following correspondences:

Plot 1: GPC of comparative product C1

Plot 2: GPC of inventive product P1

Plot 3: GPC of inventive product P3

Plot 4: GPC of comparative product C2

Table 6 lists certain significant peaks in the chromatograms and also their assignment to particular constituents of the products analysed.

TABLE 6

| Peak No. | Peak contained in plot | Mp (molar mass in g/mol at the peak apex) | Assigned structure; presumed structural unit labelled with (*) |
|---|---|---|---|
| 1 | 1-4 | 99.3 | Furfuryl alcohol (molar mass 98.1 g/mol) |
| 2 | 4 | 145 | Resorcinol (molar mass 1110.111 g/mol) |
| 3 | 1-4 | 155.3 | |
| 4 | 4 | 214.8 | Bisphenol A (molar mass 228.286 g/mol) |
| 5 | 2, 3 (shoulder) | 268.0 | mono transesterification product<br>Molecular Formula = $C_{11}H_{20}O_5Si$<br>Formula Weight = 260.359* |
| 5.1 | 2, 3 | 313.3-313.8 | di transesterification product<br>Molecular Formula = $C_{14}H_{20}O_6Si$<br>Formula Weight = 312.391* |
| 5.2 | 2, 3 | 347.7-351.0 | tri transesterification product<br>Molecular Formula = $C_{17}H_{20}O_7Si$<br>Formula Weight = 364.422* |

TABLE 6-continued

| Peak No. | Peak contained in plot | Mp (molar mass in g/mol at the peak apex) | Assigned structure; presumed structural unit labelled with (*) |
|---|---|---|---|
| 5.3 | 2, 3 | 384.4-388.4 | tetra transesterification product<br>Molecular Formula = $C_{20}H_{20}O_9Si$<br>Formula = 416.454* |
| 6 | 2, 3 | 588-598 | |
| 7 | 2, 3 | 776 | |
| 8 | 3 | 945 | |
| 9 | 3 | 1100 | |
| | none | | Tetraethyl orthosilicate<br>Molecular Formula = $C_8H_{20}O_4Si$<br>Formula Weight = 208.327 |

All GPC plots contain a peak assignable to the monomeric furfuryl alcohol, since all the products analysed contain monomeric furfuryl alcohol. Plot 4 has GPC peaks which can be assigned to resorcinol and bisphenol A, respectively, since comparative product C2 contains these constituents. Only plots 2 and 3 (inventive products P1 and P3) have peaks which can be assigned to the mixed furfuryl/ethyl esters (having 1, 2 or 3 furfuryl radicals) of orthosilicic acid or to the furfuryl tetrasilicate (compounds of the Formula (I)), respectively. A peak assignable to tetraethyl orthosilicate (molar mass 208.327 g/mol) is not evident in plot 2, despite the fact that product P1 was prepared by reacting tetraethyl orthosilicate with furfuryl alcohol. This is a further indication that furfuryl alcohol has undergone reaction with tetraethyl orthosilicate (compound of the Formula (II)) to give compounds of the Formula (I).

4. Physical Characterization

Certain physical parameters of the inventive products P1-P5 and of the comparative products C1 and C2 are compiled in Table 7.

TABLE 7

| | Density @ 20° C. [g/cm³] | Refractive index $n^D_{20}$ | Viscosity @ 20° C. (Rotary experiment) [mPa*s] | Surface tension acc. to Wilhelmy @ 25° C. [mN/m] |
|---|---|---|---|---|
| P1 | 1.182 | 1.487 | 11 | 35.4 |
| P3 | 1.231 | 1.479 | 42 | n.d. |
| P4 | 1.133 | 1.465 | 9 | n.d. |
| P5 | n.d. | n.d. | 940 | n.d. |

TABLE 7-continued

|  | Density @ 20° C. [g/cm³] | Refractive index $n^D_{20}$ | Viscosity @ 20° C. (Rotary experiment) [mPa*s] | Surface tension acc. to Wilhelmy @ 25° C. [mN/m] |
|---|---|---|---|---|
| C1 | 1.160 | 1.485 | 20 | n.d. |
| C2 | 1.137 | 1.501 | 12 | 40.5 |

In Table 7, "n.d." denotes "not determined", meaning that there was no measurement of the parameter in question.

In spite of their substantially lower fraction of monomeric furfuryl alcohol, the inventive products P1, P3 and P4 have a viscosity situated within the same order of magnitude as that of comparative products C1 and C2, and they are therefore suitable for use as binders in the no-bake process. The product P5 is suitable for use as a binder in the warm-box or hot-box process.

With regard to the other parameters, the inventive products are not significantly different from the comparative products.

5. Application as Acid-Curable Binder in the No-Bake Process

Test specimens in the form of bending bars were produced from moulding mixtures comprising silica sand H32 (obtainable from Quarzwerke GmbH, D-50207 Frechen) as mould raw material, the comparative product C1 or one of the inventive products P6 to P8 as acid-curable binder, and the activator S1 or S2. The activators S1 and S2 used respectively for curing had the composition specified in Table 8 (based on 100 parts by weight of activator each).

TABLE 8

| Activator | para-Toluene-sulfonic acid | Sulfuric acid | Monoethylene glycol | Water |
|---|---|---|---|---|
| S1 | 65.0 | 1.0 | 0 | 34.0 |
| S2 | 48.2 | 0.8 | 23.0 | 28.0 |

The compositions of the individual moulding mixtures can be seen from Table 9. Curing took place in the no-bake process. Determinations were made of the working properties of the moulding mixtures and also of the flexural strength of the resulting test specimens, at various points in time after curing (performance investigation). The results of the performance investigation are compiled in Table 9. In that table, the pbw figures correspond to the parts by weight of sand, binder and activator in the respective moulding mixture.

The workability time was determined in accordance with the P 72 information sheet "Binder testing—testing of cold-curing, synthetic resin-bonded, moist moulding materials with addition of curing agent" from the VDG (German Foundrypersons Association) using an acid-resistant steel test rod having a diameter of around 6 mm and a weight of 12 g, this bar having conical tapering at one end and carrying, at the tip of the cone, a hemisphere with a diameter of 2 mm. The test is repeated on the test specimen at intervals of 30 s in each case until the tip of the testing pin, placed cautiously onto the test specimen, no longer leaves any deeper impression in the core than that corresponding to its radius (around 1 mm). The time which elapses (in min) between the addition of resin and the point in time at which the tip of the test pin, placed cautiously onto the test specimen, no longer leaves any deeper impression in the core than that corresponding to its radius is the workability time of the test mixture. The cure time is determined in a similar way to the determination of the workability time, with the test rod being weighted with an additional weight of 100 g.

TABLE 9

| | | | | | Room temperature: 21° C. Sand temperature: 21° C. | | Relative humidity: 45% | |
|---|---|---|---|---|---|---|---|---|
| | PERFORMANCE INVESTIGATION | | | | | | | |
| | Binder pbw per | Activator pbw per 100 pbw | Workability | Cure | Flexural strengths in N/cm² at different times after curing | | | |
| Experiment No. | 100 pbw sand H 32 | of Sand H 32 | time in minutes | time in minutes | 1 hour | 2 hours | 4 hours | 24 hours |
| 1 | C1 1.00 | S1 0.50 | 13 | 19 | 195 | 390 | 435 | 475 |
| 2 | C1 1.00 | S1 0.25 | 35 | 45 | 65 | 190 | 215 | 305 |
| 3 | C1 1.00 | S2 0.50 | 42 | 58 | 0 | 30 | 180 | 365 |
| 4 | C1 1.00 | S2 0.25 | 55 | 70 | 0 | 10 | 50 | 250 |
| 5 | P6 1.00 | S2 0.25 | 6 | 8 | 110 | 170 | 200 | 260 |
| 6 | P7 1.00 | S2 0.25 | 7 | 11 | 160 | 210 | 255 | 315 |
| 7 | P7 1.00 | S1 1:1 in ethanol 0.25 (incl. ethanol) | 12 | 18 | 95 | 175 | 215 | 260 |
| 8 | P8 1.00 | S2 0.25 | 8 | 12 | 95 | 220 | 235 | 255 |

The moulding mixtures with the inventive products P6 to P8 as binder have significantly shorter cure times, for a given quantity and composition of activator, than those with the comparative product C1 as binder (comparison of experiments 4, 5, 6 and 8). The high reactivity of the binder compositions of the invention makes it possible to lessen the amount of activator used in the moulding mixtures of the invention and to use activators with a lower acid content and/or with less-corrosive acids (e.g. p-toluenesulfonic acid instead of sulfuric acid) while nevertheless obtaining test specimens of acceptable strength. If necessary, the workability time of the moulding mixture can be extended by dilution of the activator (see experiment 7).

Following performance investigation, test specimens (bending bars) produced from moulding mixtures comprising silica sand H32 (obtainable by Quarzwerke GmbH, D-50207 Frechen) as mould raw material with the comparative product C1 or with the inventive product P7 as binder and with the activators S1 or S2 were subjected to pyrolysis at 900° C. The pyrolysis gases were analysed for the concentration (in mg/kg of moulding mixture) of certain emissions-relevant lead components. The compositions of the corresponding moulding mixtures, the results of the performance investigation of the test specimens, and the concentrations of certain emissions-relevant lead components in the pyrolysis gas from pyrolysis of the test specimen are listed in Table 10.

In moulding mixtures with the inventive product P7 as binder, as a result of the silicon fraction present therein, the amount of carbon introduced by the binder is reduced for the same binder composition as in the moulding mixture with the comparative product C1 as binder, and so a smaller amount of organic emissions are released on the burning of the binder.

The emissions of benzene and toluene reduce significantly if instead of the activator S1, the activator S2, which has a lower para-toluenesulfonic acid content, is used. With the activator S2, however, test specimens having acceptable strengths are obtained only from moulding mixtures with the binder of the invention. When using the binder of the invention, accordingly, it is possible to achieve a reduction in the emissions of benzene and toluene because of the ability to use activators with a lower level of para-toluenesulfonic acid without detractions from the flexural strength of the mouldings.

TABLE 10

| Composition of the moulding mixture | | | | | |
|---|---|---|---|---|---|
| Binder pbw per 100 pbw of sand H 32 | | C1 1 | C1 1 | P7 1 | P7 1 |
| Activator pbw per 100 pbw of sand H 32 | | S1 0.5 | S2 0.5 | S1 0.5 | S2 0.5 |
| Performance investigation | | | | | |
| Room temperature | ° C. | 22.5 | 22.6 | 22.7 | 22.7 |
| Sand temperature | ° C. | 21.3 | 21.3 | 21.3 | 21.3 |
| Relative humidity | % | 26 | 26 | 26 | 51 |
| Workability time | min | 15 | 68 | 3 | 7 |
| Cure time 100 g | min | 23 | 115 | 4 | 13 |
| Flexural strength after 1 h | N/cm$^2$ | 110 | 0 | 170 | 90 |
| Flexural strength after 2 h | N/cm$^2$ | 230 | 0 | 230 | 200 |
| Flexural strength after 4 h | N/cm$^2$ | 260 | 40 | 250 | 250 |
| Flexural strength after 24 h | N/cm$^2$ | 220 | 210 | 220 | 265 |
| Emissions on pyrolysis | | | | | |
| Benzene | mg/kg | 204.5 | 76.5 | 177.5 | 85 |
| Toluene | mg/kg | 11 | 1.5 | 6 | 1.5 |
| o/m/p-Xylene | mg/kg | 1 | 2 | 1 | 1 |
| Mesityl oxide | mg/kg | 2.9 | 1.9 | 0.3 | 0.6 |
| Styrene | mg/kg | 3.5 | 3.85 | 1.95 | 1.65 |
| Isophorone | mg/kg | 6.85 | 5 | 2.65 | 1.95 |
| N-Methylaniline | mg/kg | 2.95 | 0.65 | 0.2 | 0.2 |
| Naphthalene | mg/kg | 20.35 | 19.75 | 11.45 | 8.95 |
| p-Toluidine | mg/kg | 0 | 0.8 | 0 | 0 |
| o-Cresol | mg/kg | 2.3 | 2.25 | 1.5 | 0.4 |
| Phenol | mg/kg | 0.25 | 0.55 | 0.25 | 0.6 |
| m-Cresol | mg/kg | 0 | 0 | 0.3 | 0 |
| 3,5-Dimethylphenol | mg/kg | 1.6 | 0.85 | 0 | 0 |
| 3-Methyl-1H-Indanole | mg/kg | 0 | 0 | 0 | 0 |

6. Further Performance Investigations

The purpose of further performance investigations is to gain fundamental knowledge regarding the suitability of moulding mixtures with the binder of the invention for the production of mouldings by 3D printing (as used for example in rapid prototyping). Here, in contrast to the performance investigations described in Section 5, the mould raw material used was of a substantially finer grade (sand GS 14), as required for 3D printing. Moreover, certain of the moulding mixtures investigated contained binders of the invention with addition of surfactants (constituent (H)). The binders for moulding mixtures to be processed by 3D printing are commonly admixed with surfactants in order to set a suitable surface tension.

Test specimens in the form of bending bars were produced from moulding mixtures comprising in each case 100 parts by weight of sand GS 14 (obtainable from Strobel Quarzsand GmbH Freihung) as mould raw material, one part by weight of a binder selected from the group consisting of the comparative products C1 and C2 and the inventive products P9 to P14 and 0.3 part by weight of an activator from the group of activators S1 to S4. The activators S1 to S4 used for curing had the composition specified in Table 11 (based on 100 parts by weight of activator in each case).

TABLE 11

| Activator | para-Toluenesulfonic acid | Sulfuric acid | Monoethylene-glycol | Water |
|---|---|---|---|---|
| S1 | 65.0 | 1.0 | 0 | 34.0 |
| S2 | 48.2 | 0.8 | 23.0 | 28.0 |
| S3 | 63.0 | 3.0 | 0 | 34.0 |
| S4 | 57.9 | 0.9 | 7.0 | 34.2 |

The compositions of the individual moulding mixtures can be seen from Table 12. Curing took place in the no-bake process. Determinations were made of the working properties of the moulding mixtures and also of the flexural strength of the resulting test specimens, at various points in time after curing (performance investigation). The results of the performance investigation are compiled in Table 12. In that table, the pbw figures correspond to the parts by weight of sand, binder and activator in the respective moulding mixture.

TABLE 12

| | | | | Room temperature: 21° C. Sand temperature: 21° C. | | Relative humidity: 43% | |
|---|---|---|---|---|---|---|---|
| | | | | PERFORMANCE INVESTIGATION | | | |
| | | | Workability time in | Cure time in | Flexural strengths in N/cm² at different times after curing | | |
| No. | Binder | Activator | minutes | minutes | 1 hour | 2 hours | 4 hours | 24 hours |
| 1 | P9 | S2 | 7 | 11 | 70 | 160 | 170 | 180 |
| 2 | P10 | S2 | 8 | 12 | 60 | 155 | 180 | 180 |
| 3 | P11 | S2 | 8 | 12 | 90 | 185 | 205 | 195 |
| 4 | P12 | S2 | 8 | 13 | 75 | 140 | 205 | 190 |
| 5 | P13 | S2 | 9 | 13 | 90 | 150 | 180 | 185 |
| 6 | P14 | S2 | 9 | 13 | 70 | 165 | 185 | 175 |
| 7 | P9 | S4 | 6 | 10 | 70 | 85 | 100 | 100 |
| 8 | P10 | S4 | 5 | 9 | 160 | 170 | 196 | 195 |
| 9 | P11 | S4 | 6 | 10 | 110 | 165 | 170 | 180 |
| 10 | P12 | S4 | 6 | 9 | 140 | 165 | 180 | 190 |
| 11 | P13 | S4 | 7 | 11 | 130 | 205 | 205 | 190 |
| 12 | P14 | S4 | 7 | 10 | 130 | 185 | 190 | 160 |
| 13 | C1 | S1 | 7 | 10 | 135 | 190 | 150 | 185 |
| 14 | C2 | S3 | 7 | 10 | 165 | 220 | 200 | 210 |

The workability times and cure times of the majority of moulding mixtures 1-12 with inventive binders are relatively short because of the high reactivity of the inventive binders, despite the fact that the acid content of the activators used in the moulding mixtures 1-12 is lower than the acid content in the moulding mixtures 13 and 14 with the non-inventive binders.

The invention claimed is:

1. Composition comprising
   (A) one or more compounds of the Formula (I)

$$Si[OR^1]_x[OR^2]_y \quad (I),$$

in which
   x is an integer selected from 1, 2, 3 and 4,
   y is an integer selected from 0, 1, 2 and 3,
   where x+y=4,
   each of the x structural units $R^1$ is furfuryl, and
   each of the y structural units $R^2$, independently of all other structural units $R^2$, is selected from the group of linear and branched alkyl radicals (B) furfuryl alcohol $R^1$—OH
   (C) one or more alkyl alcohols $R^2$—OH, where $R^2$ in each case is selected from the group of linear and branched alkyl radicals
   (D) one or more compounds from the group consisting of alkoxides of elements from the group consisting of B, Al, Sn, Ti and Zr and organoelement compounds of elements from the group consisting of B, Al, Sn, Ti and Zr.

2. Composition according to claim 1, comprising
   (B) a fraction of furfuryl alcohol in the range from 1% to 40%,
   (C) a total fraction of alkyl alcohols $R^2$—OH in the range from 0.5% to 10%,
   (D) a total fraction of elements from the group consisting of B, Al, Sn, Ti and Zr in the range from 0.01% to 0.5%,
   based in each case on the total mass of the composition.

3. Composition according to claim 1, in which constituent (A) is selected from those compounds of the Formula (I) in which each of the y structural units $R^2$, independently of all other structural units $R^2$, is selected from the group consisting of methyl, ethyl, propyl, isopropyl, butyl and isobutyl, y is an integer selected from 1, 2 and 3, and/or
   (C) is selected from the group consisting of methanol, ethanol, propanol, isopropanol, butanol and isobutanol, and/or
   (D) is selected from the group consisting of aluminium triisopropoxide, tri-n-butyl borate, tetra-n-butyl orthotitanate, tetraisopropyl titanate, tetrakis(2-ethylhexyl) titanate and dibutyltin dilaurate.

4. Process for preparing a composition according to claim 1, where the process comprises the following step:
   reaction of furfuryl alcohol,
   with one or more compounds of the Formula (II)

$$Si[OR^2]_a[OR^4]_c \quad (II),$$

in which
   a and c are integers selected from 0, 1, 2, 3 and 4, where one of a and c is greater than 0,
   where a+c=4,
   each of the a structural units $R^2$, independently of all other structural units $R^2$, is selected from the group of linear and branched alkyl radicals, each of the c structural units $R^4$, independently of all other structural units $R^4$, is selected from the group of structural units of the formula $$-(Si[OR^2]_d-O)_n-Si[OR^2]_f \quad \text{(III)},$$

in which
each of the d+f structural units $R^2$, independently of all other structural units $R^2$, is selected from the group of linear and branched alkyl radicals,
d=2,
f=3,
n is an integer in the range from 1 to 10,
at a temperature in the range from 80° C. to 150° C.,
in the presence of one or more compounds from the group consisting of alkoxides of elements from the group consisting of B, Al, Sn, Ti and Zr and organoelement compounds of elements from the group consisting of B, Al, Sn, Ti and Zr.

5. Process according to claim 4, where the compound of the Formula (II) is selected from the group consisting of those compounds of the Formula (II) in which
(i) $R^2$ is selected from the group consisting of methyl, ethyl, propyl, isopropyl, butyl and isobutyl,
c=0, a=4;
(ii) $R^2$ is selected from the group consisting of methyl, ethyl, propyl, isopropyl, butyl and isobutyl,
a=3, c=1,
$R^4$ is selected from the group consisting of those structural units of the Formula (III) in which
$R^2$ is selected from the group consisting of methyl, ethyl, propyl, isopropyl, butyl and isobutyl,
d=2, f=3,
n is an integer in the range from 1 to 10.

6. Process according to claim 4, where an amount of substance of 1 mol to 5 mol, of furfuryl alcohol per mole of silicon bonded in the compounds of the Formula (II) is used, and/or
a total amount of substance of 0.001 mol to 0.05 mol of compounds from the group consisting of alkoxides of elements from the group consisting of B, Al, Sn, Ti and Zr and organoelement compounds of elements from the group consisting of B, Al, Sn, Ti and Zr per mole of silicon bonded in the compounds of the Formula (II) is used.

7. Reaction mixture for forming an acid-cured binder, comprising
(i) a composition according to claim 1
(ii) an activator comprising
a) one or more acids from the group consisting of sulfonic acids and phosphoric acid,
b) optionally, one or more acids from the group of carboxylic acids,
c) water,
d) and, optionally, one or more compounds from the group consisting of monoethylene glycol, diethylene glycol, polyethylene glycol and 1,2-propylene glycol.

8. Reaction mixture according to claim 7, further comprising
(iii) one or more refractory granular substances, in an amount of 80% or more based on the total mass of the reaction mixture.

9. Process for producing an article selected from the group consisting of foundry cores, foundry moulds and feeders, comprising
producing a moulding mixture comprising
(i) a composition according to claim 1,
(ii) an activator comprising:
a) one or more acids from the group consisting of sulfonic acids and phosphoric acid,
b) optionally one or more acids from the group of carboxylic acids,
c) water, and
d) optionally one or more compounds from the group consisting of monoethylene glycol, diethylene glycol, polyethylene glycol and 1,2-propylene glycol,
(iii) one or more refractory granular substances,
moulding the moulding mixture curing the composition
(i) by the activator (ii).

10. Composition according to claim 2, wherein the fraction of furfuryl alcohol is in the range from 1% to 24%.

11. Composition according to claim 3, in which constituent
(A) is selected from those compounds of the Formula (I) in which all structural units $R^2$ are ethyl.

12. Process for preparing a composition according to claim 4, wherein the reaction of furfuryl alcohol takes place at a temperature in the range from 100° C. to 120° C.

13. Process according to claim 5, where
the compound of the Formula (II) is selected from the group consisting of those compounds of the Formula (II) in which
(i) all structural units $R^2$ are ethyl,
c=0, a=4;
(ii) all structural units $R^2$ are ethyl,
a=3, c=1,
$R^4$ is selected from the group consisting of those structural units of the Formula (III) in which
all structural units $R^2$ are ethyl,
d=2, f=3,
n is an integer in the range from 1 to 10.

14. Process according to claim 6, where an amount of substance of 1.53 mol to 5 mol of furfuryl alcohol per mole of silicon bonded in the compounds of the Formula (II) is used.

15. Process according to claim 6, where an amount of substance of 2.1 mol to 5 mol of furfuryl alcohol per mole of silicon bonded in the compounds of the Formula (II) is used.

16. A method of producing an article comprising:
providing a composition according to claim 1 to form a moulding mixture to produce the article, wherein the article selected from the group consisting of foundry cores, foundry moulds and feeders.

17. A method of 3D printing, comprising:
providing a composition according to claim 1, and printing the composition.

18. A method of construction, comprising:
providing a composition according to claim 1 to form a putty or sealant; and applying the putty of sealant.

* * * * *